United States Patent
Takeda

(10) Patent No.: US 8,395,790 B2
(45) Date of Patent: Mar. 12, 2013

(54) IMAGE FORMING APPARATUS

(75) Inventor: Shoji Takeda, Tokyo (JP)

(73) Assignee: Canon Kabushiki Kaish, Tokyo (JP)

( * ) Notice: Subject to any disclaimer, the term of this patent is extended or adjusted under 35 U.S.C. 154(b) by 0 days.

(21) Appl. No.: 13/585,648

(22) Filed: Aug. 14, 2012

(65) Prior Publication Data

US 2012/0307320 A1    Dec. 6, 2012

Related U.S. Application Data

(63) Continuation of application No. 12/326,761, filed on Dec. 2, 2008, now Pat. No. 8,264,700.

(30) Foreign Application Priority Data

Dec. 3, 2007   (JP) ................. 2007-312658

(51) Int. Cl.
    *H04N 1/04*      (2006.01)
(52) U.S. Cl. ......... 358/1.13; 358/1.5; 358/474; 358/475
(58) Field of Classification Search ................. 358/1.13, 358/1.5, 474, 475, 468
See application file for complete search history.

(56) References Cited

U.S. PATENT DOCUMENTS 6,903,847 B2 *   6/2005   Tsukada ................. 358/474

FOREIGN PATENT DOCUMENTS

JP      11-245446 A     9/1999

* cited by examiner

*Primary Examiner* — Houshang Safaipour
(74) *Attorney, Agent, or Firm* — Canon U.S.A., Inc. IP Division

(57) ABSTRACT

Image forming apparatus that forms an electrostatic latent image on a surface of a photosensitive member with a laser beam, including a generation unit configured to generate a high-speed clock and a low-speed clock mutually different in frequency, a scanning unit configured to perform scanning of the laser beam in a main scanning direction based on the low-speed clock, a detection unit configured to detect the laser beam during a scanning operation performed by the scanning unit, a first shift register unit configured to receive a detection signal from the detection unit according to the high-speed clock, and an output unit configured to receive a parallel output of the first shift register unit in synchronization with the low-speed clock and to output detection timing of the laser beam as a detection signal synchronized with the low-speed clock and a value corresponding to a shift number defined by the high-speed clock.

20 Claims, 8 Drawing Sheets

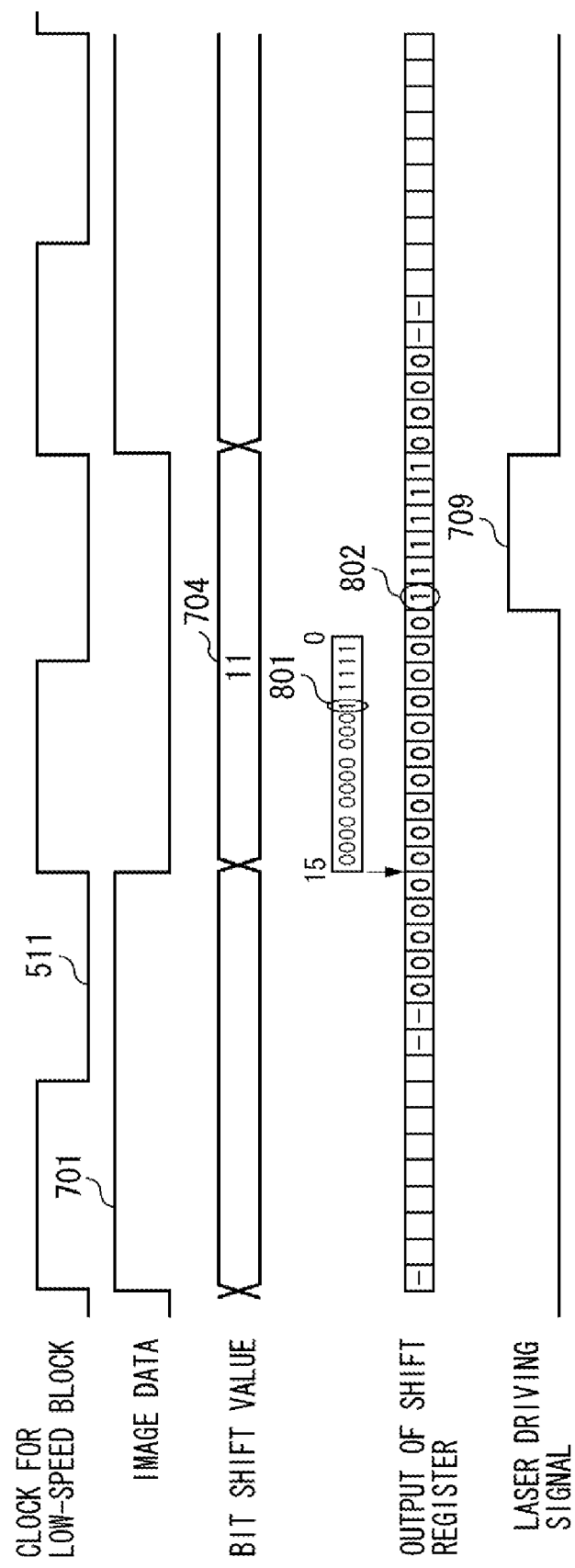

IMAGE FORMING APPARATUS

CROSS-REFERENCE TO RELATED APPLICATIONS

This application is a continuation of U.S. patent application Ser. No. 12/326,761, filed Dec. 2, 2008, which claims the benefit of Japanese Application No. 2007-312658, filed Dec. 3, 2007, both of which are hereby incorporated by reference herein in their entirety.

BACKGROUND OF THE INVENTION

1. Field of the Invention

The present invention relates to an image forming apparatus capable of, according to an electrophotographic method, forming an electrostatic latent image on a photosensitive drum with a laser beam scanning on the drum surface and developing a visible image on a recording medium by applying toner to the electrostatic latent image.

2. Description of the Related Art

An image forming apparatus configured to form an electrostatic latent image on a photosensitive drum and develop a visible toner image on a recording medium according to an electrophotographic method generally performs scanning with a laser beam on the photosensitive drum to form an electrostatic latent image on the drum surface.

An example method for forming an electrostatic latent image is described below with reference to FIG. 2. A photosensitive member 107 (photosensitive drum) can rotate around a horizontal axis thereof in a direction indicated by an arrow 308 at timing synchronized with completion of one cycle of a laser scanning operation. A polygonal mirror 102 can rotate around a vertical axis thereof in a direction indicated by an arrow 102A at a constant angular speed. A laser beam 301 emitted from a semiconductor laser generator 101 is incident on a reflection surface of the polygonal mirror 102. When the polygonal mirror 102 is rotating around its vertical axis, scanning of the laser beam 301 on the photosensitive member 107 can be performed along a scanning line indicated by an arrow 303. A beam detection (BD) sensor 302, placed on an upstream side of the photosensitive member 107, detects the laser beam 301 reflected (deflected) by the polygonal mirror 102. The electrostatic latent image writing method includes starting a laser driving operation based on image data when the laser beam 301 reaches an image writing start position 309 and forming an electrostatic latent image on the photosensitive member 107 within a predetermined region 307.

The electrostatic latent image writing method includes rotating the photosensitive member 107 in the direction of the arrow 308 by a predetermined amount (e.g., 42.33 μs) when a rotational angle of the polygonal mirror 102 exceeds a predetermined angle and restarting the scanning of the laser beam 301 for the next line on the photosensitive member 107 with another (next) reflection surface of the polygonal mirror 102. In this case, to adjust the image writing start position 309 for image data of each line, accurately measuring a time required for the laser beam 301 to travel from the BD sensor 302 to the image writing start position 309 is required, as discussed in Japanese Patent Application Laid-Open No. 2006-251513 and Japanese Patent Application Laid-Open No. 7-72400.

However, image data that is used to drive the semiconductor laser generator 101 and a rotation of the rotary polygonal mirror 102 that performs scanning of the laser beam 301 are in an asynchronous relationship. In this respect, there is a conventional method for obtaining a beam detection signal from the BD sensor 302 according to a high-speed clock and generating a synchronization (sync) clock, which is N demultiplied in frequency referring to the detection timing, as an image clock. However, according to this conventional method, various circuitry requirements need to be satisfied to modify the clock. The circuit using a high-speed clock is complicated in both designing and operational aspects.

SUMMARY OF THE INVENTION

Exemplary embodiments of the present invention are directed to a technique capable of speedily receiving a laser beam detection signal with a simple circuit arrangement and capable of detecting start timing for image writing with a low-speed circuit. Furthermore, exemplary embodiments of the present invention are directed to a technique capable of accurately controlling an image writing start position with a simple circuit arrangement.

According to an aspect of the present invention, an image forming apparatus is configured to form an electrostatic latent image on a surface of a photosensitive member with a laser beam scanning on the surface of the photosensitive member. The image forming apparatus includes a generation unit configured to generate a high-speed clock and a low-speed clock mutually different in frequency, a scanning unit configured to perform scanning of the laser beam in a main scanning direction based on the low-speed clock, a detection unit configured to detect the laser beam during a scanning operation performed by the scanning unit, a first shift register unit configured to receive a detection signal from the detection unit according to the high-speed clock, and an output unit configured to receive a parallel output of the first shift register unit in synchronization with the low-speed clock and to output detection timing of the laser beam as a detection signal synchronized with the low-speed clock and a value corresponding to a shift number defined by the high-speed clock.

According to an exemplary embodiment of the present invention, there is provided an image forming apparatus including a high-speed block capable of realizing high-speed performances and capable of improving the accuracy in image formation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 8 is a timing chart illustrating an example operation performed by the laser driving unit illustrated in FIG. 7.

DETAILED DESCRIPTION OF THE EMBODIMENTS

Figure 1:
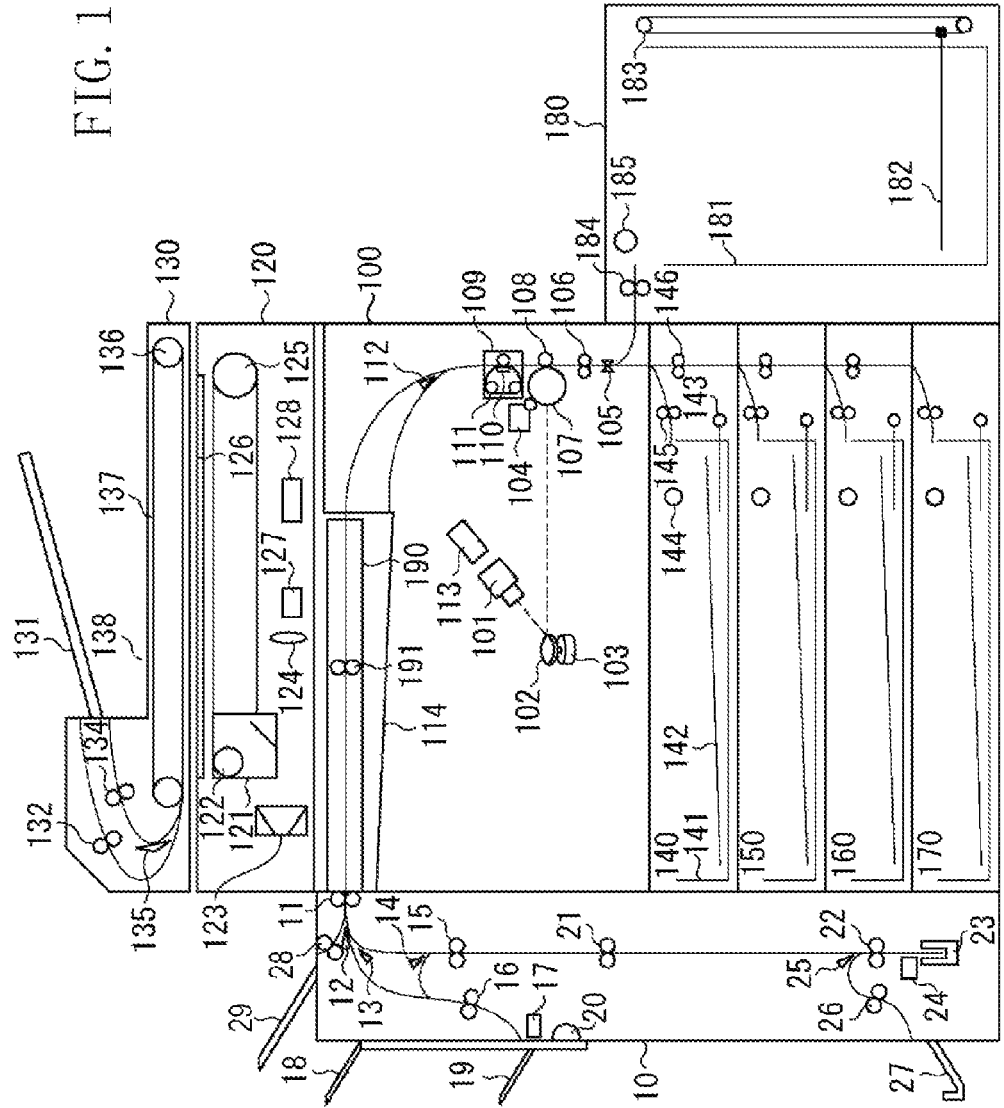
FIG. 1 illustrates an example configuration of a digital copying machine according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

FIG. 1 illustrates an example configuration of a digital copying machine (serving as an image forming apparatus) according to an exemplary embodiment of the present invention.

The digital copying machine includes a document feeding unit 130, a document reading unit 120, an image forming unit 100, a conveying unit 190, a plurality of paper feed stages (built-in paper feed stages 140, 150, 160, and 170 and a deck paper feed stage 180), and a post-processing apparatus 10.

The document feeding unit 130 includes a document placing tray 131 on which documents can be placed and rollers 132, 134 successively conveying the documents to a document reading position. A document conveying belt 137, driven by a motor 136, can convey each document to a predetermined position (document reading position). The document reading unit 120 starts a document reading operation when the document reaches the document reading position. A flapper 135, having a conveyance path switching function, can guide a document toward a discharge tray 138 when the motor 136 rotates in the opposite direction after the reading operation is completed.

The document reading unit 120 includes an exposure lamp 122 (e.g., a fluorescent lamp or a halogen lamp), which irradiates a document on a document positioning glass plate 126 with light while shifting in a direction perpendicular to its longitudinal direction. First and second mirror stations 121 and 123 sequentially reflect scattered light from the document, when the document is irradiated with light emitted from the exposure lamp 122. Then, the scattered light reaches a lens 124. The second mirror station 123 can slide at a speed equivalent to a half of the moving speed of the first mirror station 121. The distance between an irradiated document surface and the lens 124 can be kept constant.

A motor 125 drives the first mirror station 121 and the second mirror station 123. A charge-coupled device (CCD) line sensor 127 has a light-receiving portion on which an image of a document can be formed via the mirror stations 121 and 123 and the lens 124. The CCD line sensor 127 includes several thousands of light-sensitive elements disposed in a predetermined line pattern. The CCD line sensor 127 successively converts image data of each line into electric data. A signal processing unit 128 processes a photoelectrically converted signal and outputs a processed signal.

The image forming unit 100 includes an exposure control unit configured to cause an image processing unit 113 to perform processing according to characteristics of electrophotography based on an output image signal of the signal processing unit 128. The exposure control unit drives a semiconductor laser 101 to emit a laser beam toward a surface of the photosensitive member 107. A motor 103 rotates the polygonal mirror 102 to deflect the laser beam and cause the laser beam to scan in a main scanning direction parallel to an axial direction of the photosensitive member 107 (i.e., a drum member).

A pre-exposure lamp (not illustrated) removes residual electric charges off the surface of the photosensitive member 107 before the photosensitive member 107 is irradiated with a laser beam. A primary charging device (not illustrated) uniformly charges the surface of the photosensitive member 107. Accordingly, when the photosensitive member 107, which is rotating, receives a laser beam, an electrostatic latent image is formed thereon. A developing unit 104 develops an electrostatic latent image on the photosensitive member 107 (drum surface) with a predetermined color toner.

A transfer sheet is conveyed from one of the paper feed stages 140, 150, 160, 170, and 180 to registration rollers 106. A sensor 105 can detect a transfer sheet having reached near the registration rollers 106. The registration rollers 106 can align the leading edge of an image formed on the photosensitive member 107 with the leading edge of a transfer sheet, when the transfer sheet is conveyed to a transfer position.

A transfer charging device 108 transfers a toner image developed on the photosensitive member 107 to a transfer sheet. A cleaner (not illustrated) removes toner particles off the surface of the photosensitive member 107, when the transfer operation is finished. When the transfer operation is finished, the transfer sheet can be easily separated from the photosensitive member 107 because the photosensitive member 107 has a large radius of curvature. When a voltage is applied to a discharging needle (not illustrated), the attraction force acting between the photosensitive member 107 and the transfer sheet is reduced. Therefore, the transfer sheet can be more easily removed off the surface of the photosensitive member 107.

The transfer sheet separated from the photosensitive member 107 is conveyed to a fixing unit 109, in which toner applied on a transfer sheet is fixed. More specifically, the fixing unit 109 includes a ceramic heater 110, a film 111, and two rollers. The heat generated by the ceramic heater 110 is efficiently transmitted to a transfer sheet via the thin film 111. A cooling roller removes heat from fixing rollers. A plurality of sheet feeding rollers, including one large roller and two small rollers, receive a transfer sheet from the fixing unit 109 and correct the surface of the transfer sheet if curled.

A direction flapper 112 can switch a discharge destination of a transfer sheet between a tray 114 and the conveying unit 190 according to an operation mode.

The conveying unit 190 includes conveyance rollers 191, which are configured to convey a transfer sheet to the post-processing apparatus 10.

The built-in paper feed stages 140, 150, 160, and 170 have similar mechanism to each other. The deck paper feed stage 180 can store a large volume of transfer sheets, compared to the capacity of the built-in paper feed stages 140, 150, 160, and 170.

As the built-in paper feed stages 140, 150, 160, and 170 are similar to each other in arrangement, an example arrangement for the built-in sheet feeding cassette 140 is described below.

A lift-up motor 143 raises or lowers a bottom plate 142 disposed on a bottom surface of a cassette 141. The bottom plate 142 can regulate the height of accumulated transfer sheets, so that the uppermost transfer sheet is held at a predetermined stand-by position. A pickup roller 144 conveys the uppermost transfer sheet from the stand-by position to a sheet feeding roller pair 145.

The sheet feeding roller pair 145, to a predetermined torque is applied in a direction opposite to a sheet feeding direction, can successively send transfer sheets to the conveyance path while preventing two or more transfer sheets from being conveyed together. A conveyance roller pair 146 conveys a transfer sheet upward when the transfer sheet is conveyed from any sheet feeding cassette positioned below the built-in paper feed stage 140.

The deck paper feed stage 180 includes a container 181 capable of accommodating transfer sheets accumulated in the vertical direction. A bottom plate 182, disposed on a bottom surface of the container 181, raises a stack of accumulated transfer sheets upward so that the uppermost sheet can be held at a stand-by position. A motor 183 drives a belt connected to the bottom plate 182. The belt, when moving in the up-and-down direction, can control the up/down movement of the bottom plate 182. A pickup roller 185 conveys a transfer sheet held at the stand-by position to a sheet feeding roller pair 184. The feeding roller pair 184 can send a transfer sheet to the conveyance path while preventing two or more transfer sheets from being conveyed together.

The post-processing apparatus 10 includes rollers 11, which receive a transfer sheet from the image forming unit 100. When the tray 29 is selected as an output destination of the received transfer sheet, a flapper 12 switches a conveyance direction of the transfer sheet to guide the transfer sheet to the tray 29 when the transfer sheet is discharged by the roller 28. The tray 29 is a discharge tray temporarily used as a discharge destination when interrupt processing is performed during the ordinary processing.

Two trays 18 and 19 are discharge trays used in the ordinary discharge operation. A transfer sheet can be conveyed to the tray 18 or 19 when two flappers 12 and 13 select a conveyance path along which the transfer sheet can be guided to rollers 16. When two flappers 13 and 14 are switched to establish a vertical conveyance path extending downward, the conveyance direction of the sheet can be changed by reversing rollers 15 to realize a reversed discharge operation. In the processing of discharging a transfer sheet to the tray 18 or 19, a stapler 17 can perform a stapling operation. A shift motor 20 can move the trays 18 and 19 in the vertical direction to selectively discharge each transfer sheet to an intended tray.

A tray 27 is a discharge tray used in a bookbinding operation. The bookbinding operation includes successively conveying transfer sheets to a primary accumulation unit 23 via the rollers 15 and rollers 21 until accumulation of a predetermined amount of transfer sheets is accomplished. A stapler 24 performs a stapling operation for bookbinding the accumulated transfer sheets. A flapper 25 changes the direction of the book-bound sheets returning from the accumulation unit 23 when the book-bound sheets are driven upward by the rollers 22 rotating in the opposite direction. Rollers 26 discharge the book-bound sheets to the tray 27.

Figure 3:
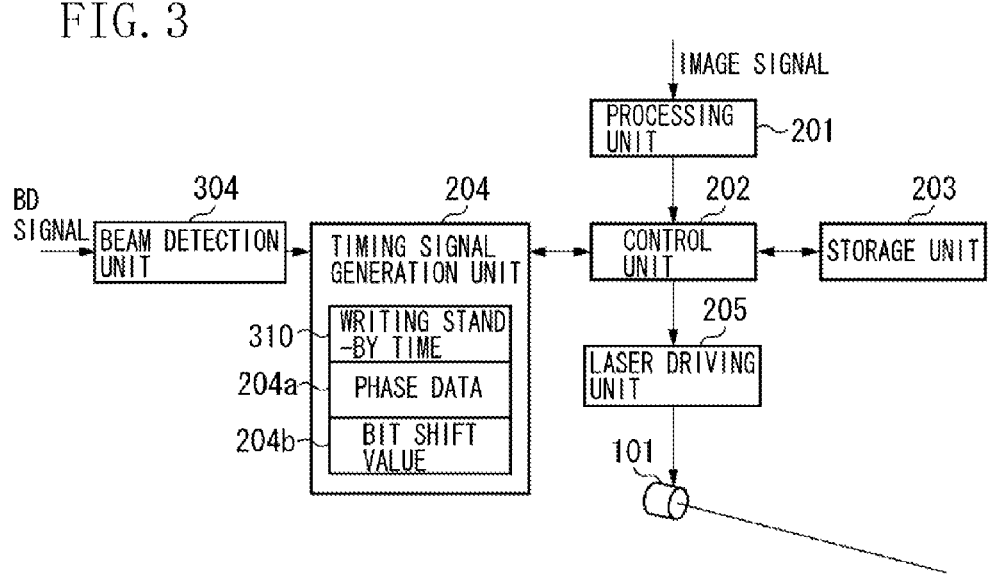
FIG. 3 illustrates an example configuration of an image processing unit according to an exemplary embodiment of the present invention.
Figure 4A:
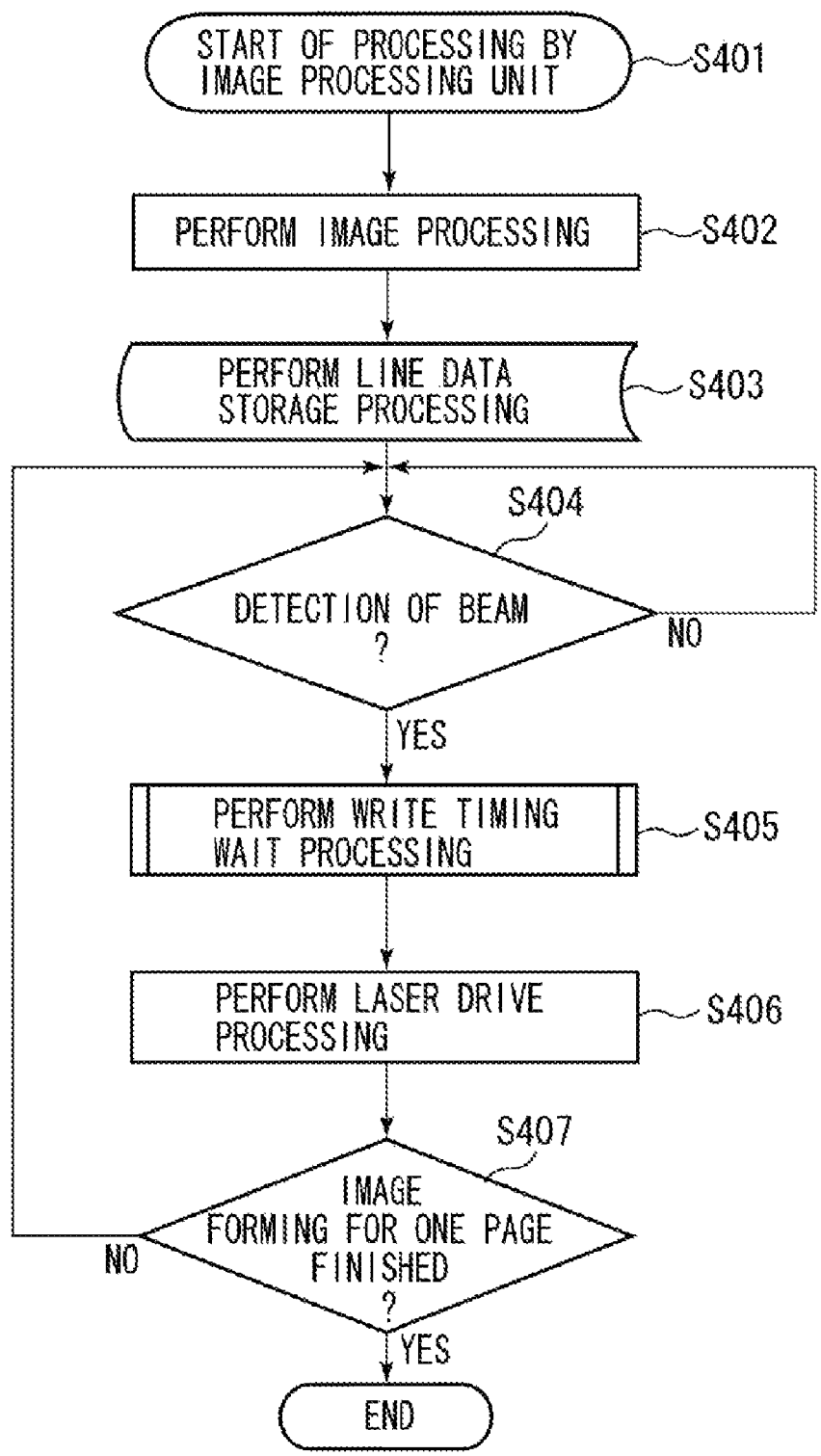
FIG. 4A is a flowchart illustrating example processing performed by the image processing unit illustrated in FIG. 3.

FIG. 3 is a block diagram illustrating an example configuration of the image processing unit 113 according to an exemplary embodiment. FIG. 4A is a flowchart illustrating an example operation performed by the image processing unit 113, as example copy processing performed by the digital copying machine illustrated in FIG. 1.

The image processing unit 113 includes a timing signal generation unit 204 and a control unit 202, which cooperatively (or independently) execute the processing illustrated in FIG. 4A. An appropriate computer executing a software program or a hardware circuit can realize the timing signal generation unit 204 and the control unit 202.

In step S401 of FIG. 4A, the image processing unit 113 starts processing in response to an output signal of the signal processing unit 128 provided in the document reading unit 120. In step S402, the image processing unit 113 causes a processing unit 201 to perform image processing (e.g., filter processing and gamma correction) according to the characteristics of the image forming apparatus.

In step S403, the image processing unit 113 performs line data storage processing, in which the processed image data is sent to the control unit 202 and temporarily stored in a storage unit 203. The control unit 202 performs time-division processing for storing the processed image data in the storage unit 203 and reading the stored image data out of the storage unit 203.

In step S404, the image processing unit 113 performs beam detection processing, in which the image processing unit 113 determines whether a beam is detected.

Figure 2:
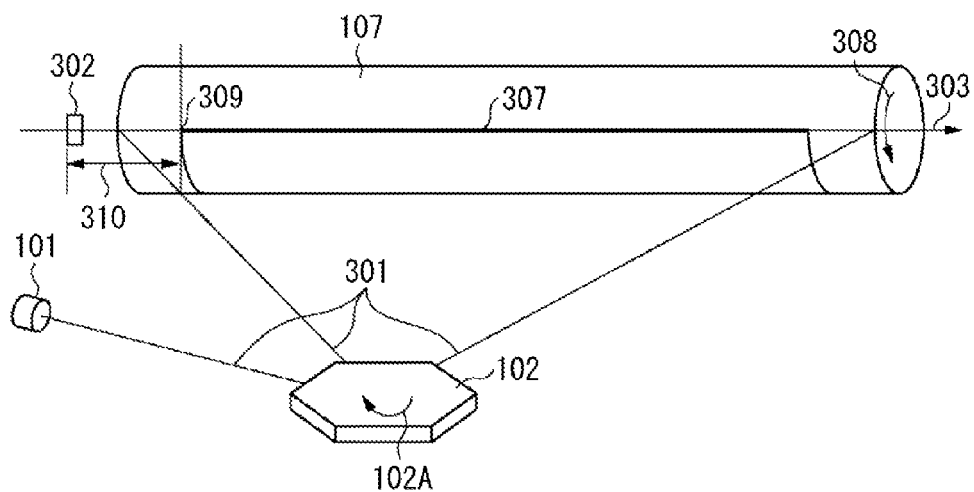
FIG. 2 illustrates an example photosensitive drum and an example laser scanning apparatus according to an exemplary embodiment of the present invention.

The photosensitive drum and the laser scanning apparatus illustrated in FIG. 2 can be used to realize a beam detecting operation according to an exemplary embodiment.

A beam spot on the photosensitive member 107 moves along a scanning line parallel to the main scanning direction (i.e., a longitudinal direction (axial direction) of the photosensitive member 107) when the laser beam 301 emitted from the semiconductor laser generator 101 is reflected (deflected) by the polygonal mirror 102 while the polygonal mirror 102 is rotating at a constant angular speed.

In this case, the BD sensor 302, serving as a photo detector positioned on the scanning line, captures the beam moving in the main scanning direction and generates a horizontal sync signal (beam detection signal (BD signal)) serving as a writing reference signal. The image processing unit 113 uses the horizontal sync signal (i.e., the BD signal) to synchronize the rotation of the polygonal mirror 102 with writing of image data on the photosensitive member 107.

Then, the laser beam 301 performs scanning on the photosensitive member 107. When a write timing wait time (writing stand-by time) 310 (indicated by the distance between the BD sensor 302 and the image writing start position 309 in FIG. 2) has elapsed after the BD signal is detected by the BD sensor 302, the image processing unit 113 starts writing image data on the photosensitive member 107 so that an electrostatic latent image can be formed in the image drawing region 307 starting from the image writing start position 309. After the beam scanning operation for writing image data of one line is completed, the photosensitive member 107 rotates by a predetermined amount in the direction indicated by the arrow 308 (i.e., in the sub scanning direction). Then, the laser scanning apparatus performs a similar beam scanning operation using the next reflection surface of the polygonal mirror 102. By repeating such operations, a two-dimensional electrostatic latent image can be formed on the photosensitive member 107.

Compared to the above-described conventional method according to which the BD signal is used as a horizontal sync signal for the control of succeeding image formations, an exemplary embodiment separates the BD signal into a BD timing signal and phase data using clocks for a high-speed block to realize accurate control.

In step S405, the image processing unit 113 performs write timing wait processing. When the BD sensor 302 illustrated in FIG. 2 generates a BD signal, the image processing unit 113 performs waiting control to adjust the write timing wait time (writing stand-by time) 310.

According to an exemplary embodiment, the timing signal generation unit 204 illustrated in FIG. 3 causes the control unit 202 to delay reading image data from the storage unit 203 for the write timing wait time (writing stand-by time) 310. According to an exemplary embodiment, a beam detection unit 304 acquires phase data 204a. The timing signal generation unit 204 calculates a bit shift value 204b based on the acquired phase data 204a.

The control unit 202 sets the calculated bit shift value 204b to a laser driving unit 205. The laser driving unit 205 controls the semiconductor laser generator 101 based on the bit shift value 204b. The timing signal generation unit 204 illustrated in FIG. 3 stores the write timing wait time (writing stand-by time) 310, the phase data 204a, and the bit shift value 204b. However, the image processing unit 113 can be appropriately modified to store the write timing wait time (writing stand-by time) 310, the phase data 204a, and the bit shift value 204b in the control unit 202 or the storage unit 203.

Figure 4B:
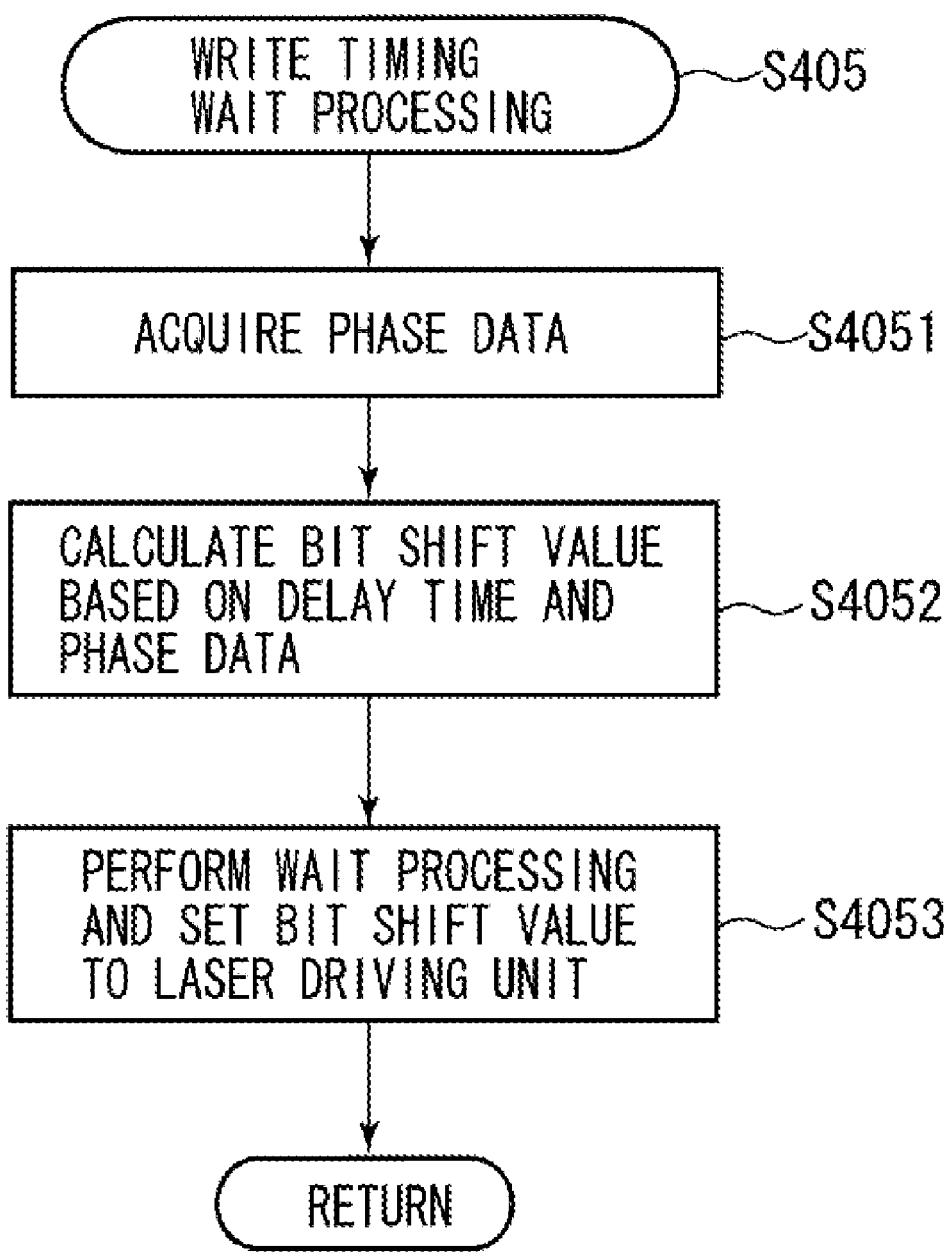
FIG. 4B is a flowchart illustrating details of write timing wait processing (step S405 in FIG. 4A) performed by the image processing unit illustrated in FIG. 3.

FIG. 4B is a flowchart illustrating details of the write timing wait processing (step S405 in FIG. 4A) performed by the image processing unit 113 (for example, by the timing signal generation unit 204 and/or the control unit 202).

When the image processing unit 113 starts the write timing wait processing (step S405), the processing proceeds to step S4051, in which the beam detection unit 304 acquires the phase data 204a of the BD timing based on the BD signal as described below with reference to FIGS. 5 and 6.

In step S4052, the timing signal generation unit 204 and/or the control unit 202 calculates the bit shift value 204b based on the predetermined write timing wait time (writing stand-by time) 310 and the acquired phase data 204a. In step S4053, the image processing unit 113 performs wait processing, and as described below with reference to FIGS. 7 and 8, the calculated bit shift value 204b is set to the laser driving unit 205. Then, the processing returns to step S405 in FIG. 4A.

The calculation of the bit shift value 204b is variable depending on the circuit arrangements of the beam detection unit 304 and the laser driving unit 205 as well as depending on the setting of the phase data 204a. For example, the calculation of the bit shift value 204b is performed in the following manner if the beam detection unit 304 and the laser driving unit 205 have circuit arrangements illustrated in FIGS. 5 and 7, in which the clock for a high-speed block is 16 times the clock for a low-speed block.

A sum of the number "a" of clocks for the low-speed block and the number "b" of clocks for the high-speed block can be used to express the write timing wait time (writing stand-by time) 310, which represents a time required for the laser beam 301 to travel from the BD sensor 302 to the image writing start position 309. It is now assumed that the value of phase data 204a is equal to the number "n" of clocks for the high-speed block corresponding to a time interval between the low-speed block clock (low-speed clock) and the BD signal, wherein "n" is a change bit in a pattern detection circuit ($0 \leq n \leq 15$). In this case, in FIG. 7, a bit shift value m (204b) satisfies the relationship b=(16−n)+m (i.e., m=b+n−16).

In step S406, the image processing unit 113 performs laser drive processing, in which the image processing unit 113 causes the control unit 202 to read image data from the storage unit 203 in response to an instruction from the timing signal generation unit 204. The image processing unit 113 shifts the image data by an amount corresponding to the bit shift value 204b set by the timing signal generation unit 204 (step S4053). The laser driving unit 205 generates a laser driving signal to drive the semiconductor laser generator 101. The image processing unit 113 performs processing for driving the semiconductor laser generator 101 to emit a laser beam for scanning of one line according to the same bit shift value 204b.

In step S407, the image processing unit 113 determines whether the image forming for a page is finished. If it is finished (YES in step S407), the processing ends. If it is not finished (NO in step S407), the processing returns to step S404 to continue beam detection processing. That is, during sequential laser scanning operations, the image processing unit 113 repeats the above-described procedure, for each line, by causing the beam detection unit 304 to acquire the phase data 204a, calculating the bit shift value 204b, and setting the calculated bit shift value 204b to the laser driving unit 205.

Figure 5:
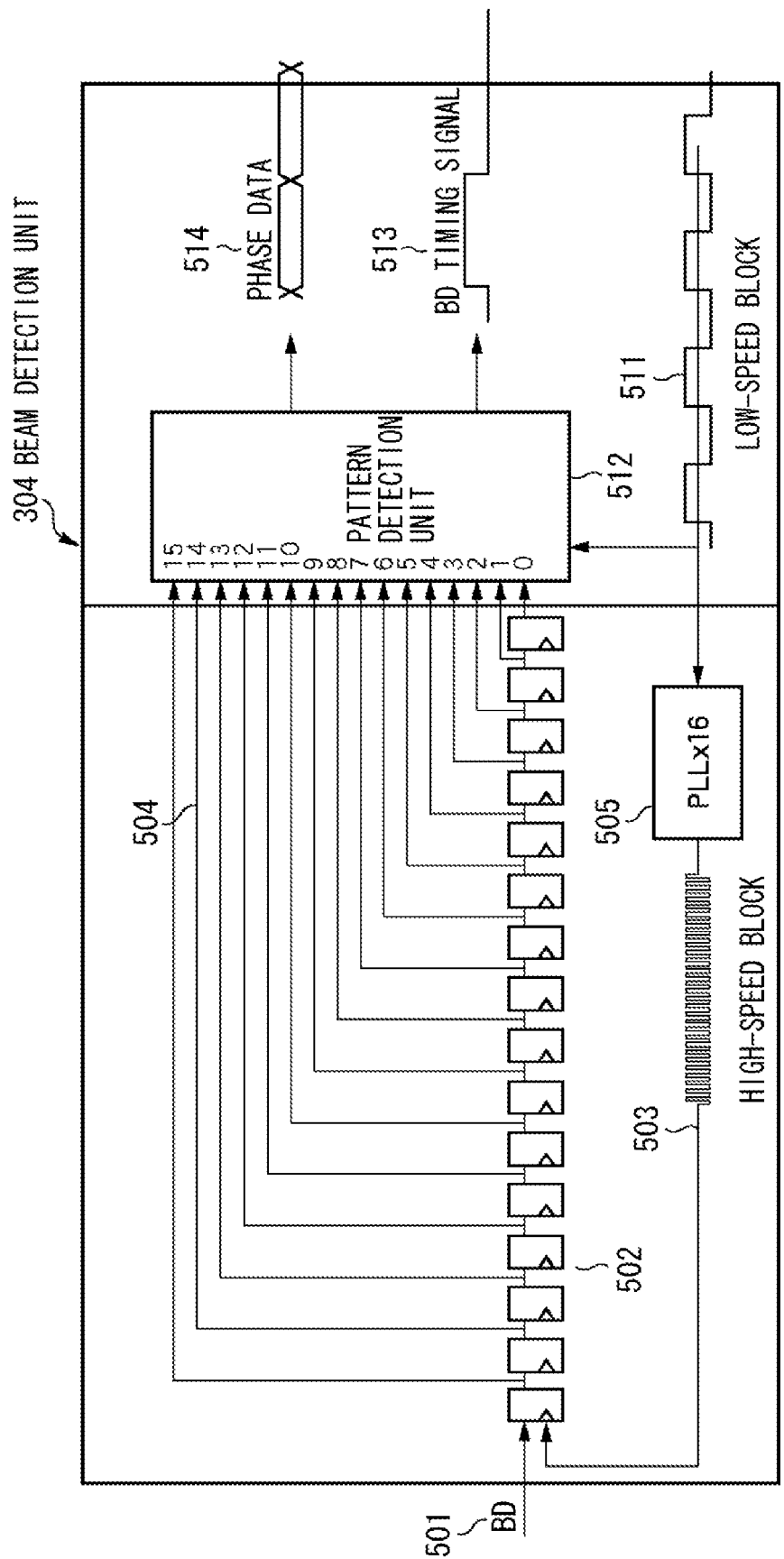
FIG. 5 illustrates an example configuration of a beam detection unit according to an exemplary embodiment of the present invention.

FIG. 5 illustrates an example configuration of the beam detection unit 304 according to an exemplary embodiment. FIG. 6 is a timing chart illustrating an example operation performed by the beam detection unit 304.

A high-speed block of the beam detection unit 304 receives a beam detection (BD) signal 501 from the BD sensor 302 (photodiode) illustrated in FIG. 2. The BD sensor 302 generates a High-level signal when the BD sensor 302 receives the laser beam 301 reflected (deflected) by the polygonal mirror 102 and otherwise generates a Low-level signal. The BD signal 501 is serially entered to a shift register 502 of the high-speed block. According to an example embodiment, the shift register 502 provides a total of 16 stages of shift amounts and perform a shift operation according to a high-speed block clock 503.

The shift register 502 converts the BD signal 501 into parallel data 504 at a period corresponding to 16 clocks of the high-speed block clock 503 and outputs the parallel data 504 to a low-speed block of the beam detection unit 304. In this case, the data positioned from the lowest bit (bit 0) to the highest bit (bit 15) are in order of newness in acquisition time. The shift register 502 can be referred to as a first shift register unit.

A phase-locked loop (PLL) 505 converts a low-speed block clock (low-speed clock) 511 into the high-speed block clock 503 as a clock multiplied by 16 (having a frequency equivalent to 16 times the frequency of the low-speed block clock (low-speed clock) 511). The low-speed block clock (low-speed clock) 511 reflects an operation of the image forming unit 100. Hereinafter, the high-speed block clock can be simply referred to as "high-speed clock" and the low-speed block clock (low-speed clock) can be referred to as "low-speed clock."

A pattern detection unit 512 receives the parallel data 504 according to the low-speed block clock (low-speed clock) 511. The pattern detection unit 512 generates a beam detection timing signal (BD timing signal) 513 based on the received 16-bit data. For example, if the 16-bit data illustrated in FIG. 6 has the 0th bit of Low (601 in FIG. 6) and the 15th bit of High (602 in FIG. 6), a change in the signal level from Low to High is present anywhere in the 16-bit data. Therefore, the pattern detection unit 512 generates the BD timing signal 513. At the same time, the pattern detection unit 512 detects a rising position 604 in the 16-bit data and outputs phase data 514 indicating a change bit position (0 to 15).

Figure 6:
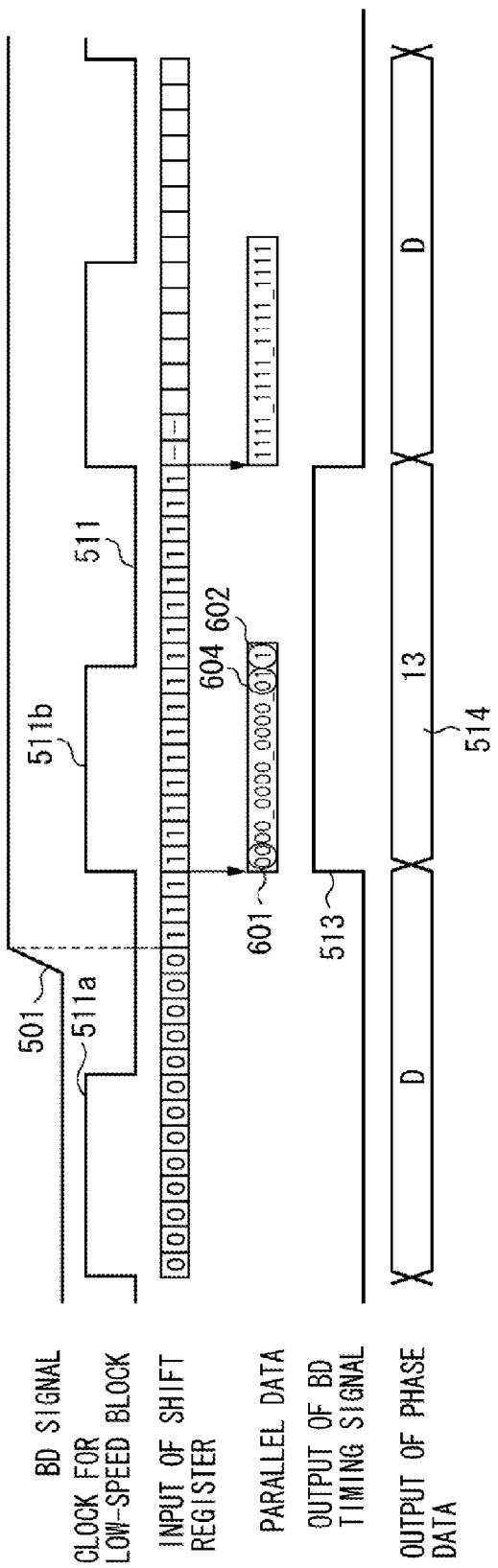
FIG. 6 is a timing chart illustrating an example operation performed by the beam detection unit illustrated in FIG. 5.

As illustrated in FIG. 6, if input of the BD signal 501 is delayed compared to the low-speed clock 511a by an amount of 13 high-speed clocks, the parallel data becomes Low (zero) in the 0th to 12th bits and High (1) in the 13th bit. Accordingly, the BD timing signal 513 (beam detection output) corresponding to the next low-speed clock 511b becomes High. At the same time, the pattern detection unit 512 outputs "13" corresponding to a shift number as the phase data 514. The output of the phase data 514 can be, for example, a parallel output or a serial output of 4-bit (0 to 15).

To perform image output processing from the image writing start position 309 illustrated in FIG. 2, it is necessary to accurately control a delay corresponding to the write timing wait time (writing stand-by time) 310 after detection of the BD signal for each line. To this end, the write timing wait time (writing stand-by time) 310 representing the time required for the laser beam 301 to travel from the BD sensor 302 to the image writing start position 309 is set as a delay expressed by "the number of low-speed clocks+the number of high-speed clocks".

For example, it is now assumed that the delay corresponding to the write timing wait time (writing stand-by time) 310 is set to be "50 low-speed clocks+14 high-speed clocks". In this case, according to the example detection illustrated in FIG. 6, the BD sensor 302 generates the BD signal 501 at the timing delayed by an amount corresponding to 13 high-speed clocks compared to the previous low-speed clock 511a (i.e., advanced by an amount corresponding to 3 high-speed clocks compared to the next low-speed clock 511b).

Accordingly, to realize a delay corresponding to 14 high-speed clocks, it is necessary to drive the semiconductor laser generator 101 after elapse of a delay corresponding to 11 high-speed clocks (=14 clocks−3 clocks) after completing the image data output processing according to the low-speed clock because the beam detection (i.e., rise timing of the BD signal 501) is 3 clocks earlier than the rise timing of the low-speed clock 511b. Accordingly, a desired delay can be realized by setting "11" as the bit shift value 204b. The above-described calculation formula gives m=b+n−16=14+13−16=11.

When counting of 50 low-speed clocks is completed after the beam detection timing, the control unit 202 outputs image data to the laser driving unit 205.

Figure 7:
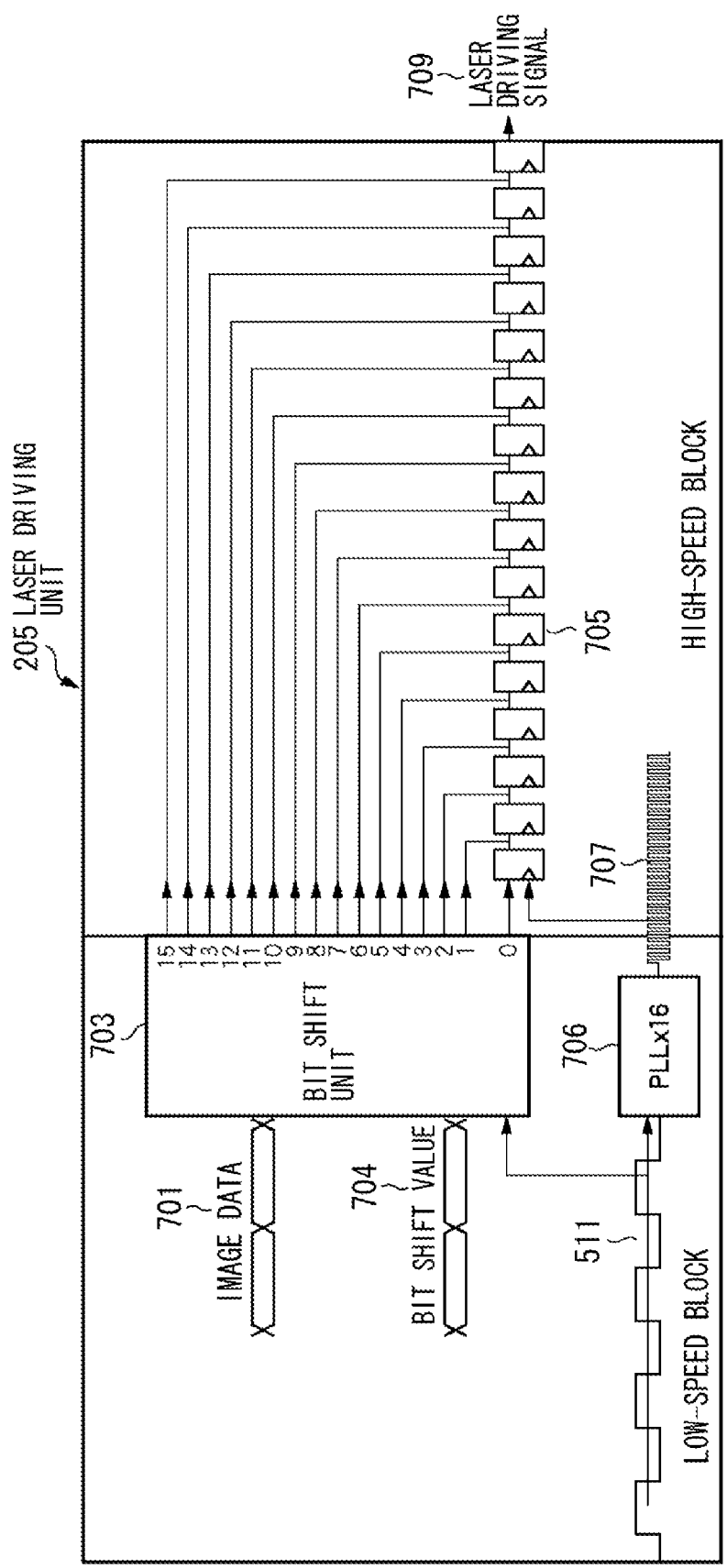
FIG. 7 illustrates an example configuration of a laser driving unit according to an exemplary embodiment of the present invention.

FIG. 7 illustrates an example configuration of the laser driving unit 205 according to an exemplary embodiment. FIG. 8 is a timing chart illustrating an example operation performed by the laser driving unit 205.

A low-speed block of the laser driving unit 205 receives image data 701 in synchronization with the low-speed clock 511. After the image data 701 is delay processed by an amount corresponding to a delay of the low-speed clock, the image data 701 is input to a bit shift unit 703. The low-speed clock 511 is identical to the low-speed clock 511 illustrated in FIG. 5. At the same time, setting of a bit shift value 704 is performed to match with the delay appeared on the phase data in the time to be delayed according to the high-speed clock.

The bit shift unit 703 performs bit shift processing according to a set value of the bit shift value 704 and performs parallel writing of image data to a high-speed shift register 705. If shifting of the high-speed shift register 705 is performed according to a high-speed clock 707, a laser driving signal 709 becomes High after a delay of a desired number of high-speed clocks. This high-speed shift register 705 can be referred to as a second shift register unit.

FIG. 8 is a timing chart illustrating an example operation performed by the laser driving unit 205, corresponding to the beam detection illustrated in FIG. 6.

The image data 701, having been delayed by an amount corresponding to 50 low-speed clocks compared to the beam detection timing, is input to the bit shift unit 703 in synchronization with the low-speed clock 511. At the same time, "11" is set as the bit shift value 704. Accordingly, an output 801 of the bit shift unit 703 becomes Low (zero) in the 5th to 15th bits and High (1) in the 0th to 4th bits. The high-speed shift register 705 sets parallel data of the output 801.

A phase-locked loop (PLL) 706 multiplies the low-speed clock 511 by 16 to generate the high-speed clock 707. The high-speed shift register 705 performs shift operations according to the high-speed clock 707 to perform parallel/serial conversion on the output data of the bit shift unit 703. The high-speed shift register 705 performs shift processing according to the high-speed block clock 707 to generate an output 802. Accordingly, a delay corresponding to 14 clocks (i.e., a sum of 3 high-speed clocks during a beam detecting operation and 11 high-speed clocks during a laser driving operation) can be surely realized.

The bit shift value is changed for each beam detecting operation (i.e., for scanning of each line).

As described above, an exemplary embodiment can accurately set a delay corresponding to a time interval between the beam detection timing and the laser output timing, as a combination of a beam detection delay (according to the high-speed clock), an image data delay (according to the low-speed clock), and a laser output delay (according to the high-speed clock). The circuit arrangement of the high-speed blocks is a simple arrangement including only the shift register 502 for serial/parallel conversion and the shift register 705 for parallel/serial conversion. Therefore, an exemplary embodiment can simplify the circuit arrangement for the high-speed blocks and can realize high-speed processing.

In other words, an exemplary embodiment can speedily receive a laser beam detection signal with a simple circuit arrangement and can detect the timing with a low-speed circuit. Furthermore, an exemplary embodiment can accurately control an image writing start position with a simple circuit arrangement. Thus, a design of a high-speed block realizing high-speed performance is feasible. The laser beam detection accuracy can be improved. The image forming accuracy can be improved. The present invention can provide an image forming apparatus having a high-speed block realizing high-speed performance and capable of improving the accuracy in image formation.

Although the above-described exemplary embodiments are described based on a digital copying machine, the present invention can be applied to other devices to improve the accuracy in beam detection and laser driving processing, and further to improve the accuracy in determining the image writing start position. For example, the present invention can be applied to a digital multifunction peripheral, a laser beam printer, or a facsimile, which incorporates an image forming apparatus configured to form an electrostatic latent image on a charged photosensitive member, developing the electrostatic latent image, and transferring the developed image to a recording medium.

The present invention can be applied to a system including a plurality of devices (e.g., a computer, an interface device, a reader, and a printer) or can be applied to a single apparatus.

Furthermore, software program code for realizing the functions or operations (described with reference to the flowcharts) of the above-described exemplary embodiments is installable to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the computer can realize the functions or processes of the exemplary embodiments.

In this case, the program code itself can realize the functions of the exemplary embodiments. The equivalents of programs are usable if they possess comparable functions. Furthermore, the present invention encompasses supplying program code to a computer with a storage (or recording) medium storing the program code. In this case, the type of program can be any one of object code, interpreter program, and OS script data.

A computer-readable storage medium supplying the program can be selected from any one of a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a digital versatile disc (DVD-ROM, DVD-R).

Moreover, an operating system (OS) or other application software running on a computer can execute part or all of actual processing based on instructions of the programs.

Additionally, the program code read out of a computer-readable storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image forming apparatus comprising:
   a photosensitive member;
   a light source configured to emit a laser beam based on input image data;
   a deflecting unit configured to deflect the laser beam emitted from the light source so that the photosensitive member is scanned with the laser beam;
   a detecting unit configured to detect the laser beam deflected by the deflecting unit and to output a detection signal according to the detection of the laser beam;
   a storage unit configured to store the detection signal in synchronization with a first clock signal and to output a bit pattern of a plurality of bits corresponding to the stored detection signal in synchronization with a second clock signal having a frequency higher than a frequency of the detection signal and lower than a frequency of the first clock signal;
   an outputting unit configured to output a timing signal based on the bit pattern output from the storage unit and to output a phase signal corresponding to a change position of the bit data in the bit pattern; and
   a control unit configured to control, based on the timing signal and the phase signal output from the outputting unit, timing to emit the laser beam from the light source based on the input image data.

2. The image forming apparatus according to claim 1, wherein the control unit generates shift data based on the phase signal output from the outputting unit, and outputs the input image data to the light source after outputting the shift data generated as a driving signal for driving the light source.

3. The image forming apparatus according to claim 2, wherein the control unit includes a plurality of storage portions configured to store the shift data or the input image data input in parallel in synchronization with the second clock signal and a second shift register configured to serially output data stored in the storage portion of the plurality of bits in synchronization with the first clock signal as the driving signal from the highest bit to the light source.

4. The image forming apparatus according to claim 1, wherein the first clock signal has a frequency that is an integral multiple of a frequency of the second clock signal.

5. The image forming apparatus according to claim 4, further comprising:
   a signal generation unit configured to multiply the second clock signal and to generate the first clock signal.

6. The image forming apparatus according to claim 5, wherein a number by which the second clock signal is multiplied corresponds to the number of bits of the bit pattern.

7. The image forming apparatus according to claim 1, wherein the storage unit includes a storage portion configured to store the detection signal serially input in synchronization with the first clock signal, and the storage unit is a first shift register configured to shift the detection signal stored in the storage portion in synchronization with the first clock signal into a storage portion of a higher bit.

8. The image forming apparatus according to claim 1, wherein the outputting unit outputs the phase signal each time the detection signal is stored in the storage portion.

9. The image forming apparatus according to claim 1, wherein the bit change position in the bit pattern corresponds to timing to start generating the detection signal in response to the detecting unit having received the laser beam.

10. The image forming apparatus according to claim 1, wherein the bit change position in the bit pattern indicates a bit position of a signal different from an adjacent digital signal in the bit pattern.

11. An image forming apparatus comprising:
    a photosensitive member;
    a light source configured to emit a laser beam based on input image data;
    a deflecting unit configured to deflect the laser beam emitted from the light source so that the photosensitive member is scanned with the laser beam;
    a detecting unit configured to detect the laser beam deflected by the deflecting unit and to output a detection signal according to the detection of the laser beam;
    a signal generating unit configured to generate a first clock signal having a frequency higher than a frequency of the detection signal output by the detecting unit and a second clock signal having a frequency lower than the frequency of the first clock signal and higher than the frequency of the detection signal;
    a determine unit configured to sample the detection signal in synchronization with the second clock signal and to determine a phase difference between the sampled detection signal and the second clock signal based on the first clock signal; and
    a control unit configured to control, based on the detection signal sampled in synchronization with the second clock signal by the determine unit and the phase difference between the detection signal and the second clock signal determined by the determine unit, timing to emit the laser beam from the light source based on the input image data.

12. The image forming apparatus according to claim 11,
    wherein the first clock signal has a first frequency and the second clock signal has a second frequency lower than the first frequency, and
    wherein the control unit controls, based on the detection signal sampled by the determine unit and the phase difference between the detection signal and the second clock signal determined by the determine unit, the timing to emit the laser beam from the light source based on the input image data on the first frequency basis.

13. The image forming apparatus according to claim 12, wherein the control unit controls the timing to emit the laser beam from the light source based on the first clock signal.

14. The image forming apparatus according to claim 13, wherein the control unit generates shift data based on the phase difference and outputs the input image data to the light source after outputting the shift data generated in synchronization with the first clock signal as a driving signal for driving the light source.

15. The image forming apparatus according to claim 11, further comprising:
   a storage unit configured to store the detection signal in synchronization with the first clock signal and to output a bit pattern of a plurality of bits corresponding to the stored detection signal in synchronization with the second clock signal,
   wherein the determine unit samples the bit pattern output in synchronization with the second clock signal by the storage unit and determines the phase difference based on a bit change position of the bit data in the bit pattern sampled in synchronization with the second clock signal.

16. The image forming apparatus according to claim 15, further comprising:
   a signal generation unit configured to multiply the second clock signal and to generate the first clock signal,
   wherein a number by which the second clock signal is multiplied to generate the first clock signal corresponds to the number of bits of the bit pattern.

17. The image forming apparatus according to claim 11, wherein the first clock signal has a frequency that is an integral multiple of the frequency of the second clock signal.

18. The image forming apparatus according to claim 17, further comprising:
   a signal generation unit configured to multiply the second clock signal and to generate the first clock signal.

19. The image forming apparatus according to claim 11, wherein the storage unit includes a storage portion configured to store the detection signal serially input in synchronization with the first clock signal, and the storage unit is a first shift register configured to shift the detection signal stored in the storage portion in synchronization with the first clock signal into a storage portion of a higher bit.

20. The image forming apparatus according to claim 19, wherein the control unit includes a plurality of storage portions configured to store the shift data or the input image data input in parallel in synchronization with the second clock signal and a second shift register configured to serially output data stored in the storage portion of the plurality of bits in synchronization with the first clock signal as the driving signal from the highest bit to the light source.

* * * * *

UNITED STATES PATENT AND TRADEMARK OFFICE
CERTIFICATE OF CORRECTION

PATENT NO. : 8,395,790 B2
APPLICATION NO. : 13/585648
DATED : March 12, 2013
INVENTOR(S) : Shoji Takeda It is certified that error appears in the above-identified patent and that said Letters Patent is hereby corrected as shown below:

On the title page, the Assignee name "Canon Kabushiki Kaish" should be changed to
--Canon Kabushiki Kaisha--.

Signed and Sealed this
Twentieth Day of August, 2013

Teresa Stanek Rea
*Acting Director of the United States Patent and Trademark Office*